United States Patent
Wang (10) Patent No.: US 10,184,811 B2
(45) Date of Patent: Jan. 22, 2019

(54) FLEXIBLE DISPLAY DEVICE AND METHOD OF DETECTING CURVED STATE OF FLEXIBLE DISPLAY PANEL THEREOF

(71) Applicant: BOE TECHNOLOGY GROUP CO., LTD., Beijing (CN)

(72) Inventor: Tao Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 203 days.

(21) Appl. No.: 15/322,288

(22) PCT Filed: Apr. 14, 2016

(86) PCT No.: PCT/CN2016/079271
§ 371 (c)(1),
(2) Date: Dec. 27, 2016

(87) PCT Pub. No.: WO2016/197700
PCT Pub. Date: Dec. 15, 2016

(65) Prior Publication Data
US 2018/0128654 A1    May 10, 2018

(30) Foreign Application Priority Data

Jun. 8, 2015 (CN) .......................... 2015 1 0312051

(51) Int. Cl.
*G01D 5/353* (2006.01)
*G01B 11/16* (2006.01)
*G06F 1/16* (2006.01)

(52) U.S. Cl.
CPC ............. *G01D 5/353* (2013.01); *G01B 11/16* (2013.01); *G01D 5/35345* (2013.01); *G06F 1/1652* (2013.01)

(58) Field of Classification Search
CPC .. G01D 5/353; G01D 5/35345; G06F 1/1652; G01B 11/16

(Continued)

(56) References Cited

U.S. PATENT DOCUMENTS

2014/0292650 A1    10/2014  Xiong
2017/0045996 A1*    2/2017  Ka ......................... G06F 3/0483
2017/0131846 A1*    5/2017  Huitema ................ G06F 3/0421

FOREIGN PATENT DOCUMENTS

CA            2073162 C        6/1999
CN           102607448 A       7/2012

(Continued)

OTHER PUBLICATIONS

Search Report and Written Opinion dated Jul. 11, 2016 from State Intellectual Property Office of the P.R. China.

(Continued)

*Primary Examiner* — Seung C Sohn
(74) *Attorney, Agent, or Firm* — Dilworth & Barrese, LLP; Michael J. Musella, Esq.

(57) ABSTRACT

What are disclosed are a flexible display device and a method of detecting a curved state of a flexible display panel thereof, which can estimate a curved state of a flexible display panel. The flexible display device includes a flexible display panel and a controller. The flexible display panel includes N optical fibers which can be curved with the curving of the flexible display panel, a laser transmitter disposed at an input terminal of the optical fiber and a light intensity detector disposed at an output terminal of the optical fiber, wherein N is an integer greater than or equal to 1. The controller is configured to acquire a light intensity parameter detected by the light intensity detector, and determine a current state of the flexible display panel according (Continued)

to the light intensity parameter, wherein M is an integer greater than or equal to 1 and smaller than or equal to N.

17 Claims, 7 Drawing Sheets

(58) Field of Classification Search
USPC .................................................. 250/214 A
See application file for complete search history.

(56) References Cited

FOREIGN PATENT DOCUMENTS

| CN | 103489372 A | 1/2014 |
|---|---|---|
| CN | 103576979 A | 2/2014 |
| CN | 103915041 A | 7/2014 |
| CN | 104081166 A | 10/2014 |
| CN | 104185772 A | 12/2014 |
| CN | 104375737 A | 2/2015 |
| CN | 104583905 A | 4/2015 |
| CN | 104683715 A | 6/2015 |
| CN | 104848798 A | 8/2015 |
| JP | 2001265265 A | 9/2001 |
| JP | 2011027822 A | 2/2011 |

OTHER PUBLICATIONS

Third Chinese Office Action dated Jan. 3, 2018.
Second Office Action dated Sep. 4, 2017.
Zhang Hongrun, Encyclopedia of Sensor Technologies, vol. 1, Beijing, Beihang University Press, Oct. 2007; Cataloging in Publication CIP Data He Zi (2007) No. 109147.
Office Action dated Feb. 28, 2017.
Wu Mei, Design and Analyze of Optical Fiber Microbend Displacement Sensor, Chinese Master's Thesis Full-text Database, Engineering Science and Technology II, Issue 7, Jul. 15, 2012.

\* cited by examiner

FLEXIBLE DISPLAY DEVICE AND METHOD OF DETECTING CURVED STATE OF FLEXIBLE DISPLAY PANEL THEREOF

TECHNICAL FIELD

Embodiments of the present invention relate to a flexible display device and a method of detecting a curved state of a flexible display panel thereof.

BACKGROUND

With the development of the display technology, technologies such as folding display and curved display are more and more widely applied. Recently, flexible organic light emitting diode (OLED) display panel becomes the hot spot of the research for its advantageous such as gorgeous color and relatively light weight.

In known flexible OLED technology, when the flexible OLED display in a curved state or a folded state is required to display a larger image, it is very easy to result in that the image cannot be completely displayed or that the user cannot see a part of the displayed image due to the relatively large curved degree of the display screen, because the flexible OLED display itself cannot predict the current curved degree of the display screen before displaying the image, which may affect the overall application effect.

SUMMARY

Embodiments of the present invention provide a flexible display device and a method of detecting a curved state of a flexible display panel thereof, which can estimate a curved state of a flexible display panel.

In order to achieve the abovementioned objective, the embodiments of the present invention employ the following technical solutions.

At an aspect, the embodiments of the present invention provide a flexible display device, including a flexible display panel and a controller; the flexible display panel includes N optical fiber which can be curved with the curving of the flexible display panel, a laser transmitter disposed at an input terminal of the optical fiber so as to transmit laser into the optical fiber and a light intensity detector disposed at an output terminal of the optical fiber so as to detect light intensity parameter at the output terminal, wherein the N is an integer greater than or equal to 1; and the controller is configured to acquire the light intensity parameter at the output terminal of M optical fiber detected by the light intensity detector, and to determine the current curved state of the flexible display panel according to the light intensity parameter of the output terminal at the M optical fiber, wherein the M is an integer greater than or equal to 1 and smaller than or equal to N.

In an exemplary example, the flexible display panel includes an inflexible region and a flexible region, and the N optical fiber is disposed in the flexible region.

In an exemplary example, the laser transmitter is configured to transmit laser with the same light intensity into the M optical fiber.

In an exemplary example, the M is equal to 1, the controller is configured to determine that the flexible display panel is in a non-curved state upon the light intensity is greater than a first predetermined threshold value; or determine that the flexible display panel is in a curved state upon the light intensity is smaller than the first predetermined threshold value.

In an exemplary example, the M is equal to 1, the controller is configured to determine that the flexible display panel is in a non-curved state upon the light intensity parameter is greater than a second predetermined threshold value; determine that the flexible display panel is in a partially curved state upon the light intensity parameter is smaller than a second predetermined threshold value and greater than a third predetermined threshold value; or determine that the flexible display panel is in a completely curved state upon the light intensity parameter is smaller than the third predetermined threshold value, wherein the second predetermined threshold value is greater than the third predetermined threshold value.

In an exemplary example, the M is greater than or equal to 2, the M optical fibers are disposed in parallel; the controller is configured to acquire a standard deviation of the light intensity parameters at the output terminals of the M optical fibers; determine whether an average value of the light intensity parameters at the output terminals of the M optical fibers is greater than a fifth predetermined threshold value upon the standard deviation is smaller than a fourth predetermined threshold value, and determine that the flexible display panel is in a non-curved state upon the average value is greater than the fifth predetermined threshold value, or determine that the flexible display panel is in a curved state upon the average value is smaller than the fifth predetermined threshold value.

In an exemplary example, the M is greater than or equal to 2, the M optical fibers are disposed in parallel; the controller is configured to acquire a standard deviation of the light intensity parameters at the output terminals of the M optical fibers; determine whether an average value of the light intensity parameters at the output terminals of the M optical fibers is greater than a seventh predetermined threshold value upon the standard deviation is smaller than a sixth predetermined threshold value; and determine that the flexible display panel is in a non-curved state upon the average value is greater than the seventh predetermined threshold value; determine that the flexible display panel is in a partially curved state upon the average value is smaller than the seventh predetermined threshold value and greater than an eighth predetermined threshold value; or determine that the flexible display panel is in a completely curved state upon the average value is smaller than the eighth predetermined threshold value, wherein the seventh predetermined threshold value is greater than the eighth predetermined threshold value.

At another aspect, embodiments of the present invention provide a method of detecting a curved state of a flexible display panel in a flexible display device, the flexible display panel includes N optical fiber which can be curved with the curving of the flexible display panel, a laser transmitter disposed at an input terminal of the optical fiber so as to transmit laser to the optical fiber, a light intensity detector disposed at an output terminal of the optical fiber so as to detect light intensity parameter at the output terminal, wherein the N is an integer greater than or equal to 1. The method includes: acquiring the light intensity parameter at the output terminal of the M optical fiber detected by the light intensity detector, wherein the M is an integer greater than or equal to 1 and smaller than or equal to N; and determining a current curved state of the flexible display panel according to the light intensity parameter at the output terminal of the M optical fiber.

In an exemplary example, the M is equal to 1, determining the current curved state of the flexible display panel according to the light intensity parameter at the output terminal of the M optical fiber includes: determining that the flexible display panel is in a non-curved state upon the light intensity parameter is greater than a first predetermined threshold value; or determining that the flexible display panel is in a curved state upon the light intensity parameter is smaller than the first predetermined threshold value.

In an exemplary example, the M is equal to 1, determining the current curved state of the flexible display panel according to the light intensity parameter at the output terminal of the M optical fiber includes: determining that the flexible display panel is in a non-curved state upon the light intensity parameter is greater than a second predetermined threshold value; or determining that the flexible display panel is in a partially curved state upon the light intensity parameter is smaller than the second predetermined threshold value and greater than a third predetermined threshold value; or determining that the flexible display panel is in a completely curved state upon the light intensity parameter is smaller than the third predetermined threshold value, wherein the second predetermined threshold value is greater than the third predetermined threshold value.

In an exemplary example, the M is greater than or equal to 2, the M optical fibers are disposed in parallel; determining the current curved state of the flexible display panel according to the light intensity parameters at the output terminals of the M optical fibers includes: acquiring a standard deviation of the light intensity parameters at the output terminals of the M optical fibers; determining whether an average value of the light intensity parameters at the output terminals of the M optical fibers is greater than a fifth predetermined threshold value upon the standard deviation value is smaller than a fourth predetermined threshold value; and determining that the flexible display panel is in a non-curved state upon the average value is greater than the fifth predetermined threshold value; or determining that the flexible display panel is in a curved state upon the average value is smaller than the fifth predetermined threshold value.

In an exemplary example, the M is greater than or equal to 2, the M optical fibers are disposed in parallel; determining the current curved state of the flexible display panel according to the light intensity parameter at the output terminal of the M optical fiber includes: acquiring a standard derivation of the light intensity parameters at the output terminals of the M optical fibers; determining whether an average value of the light intensity parameters at the output terminals of the M optical fibers is greater than a seventh predetermined threshold value upon the standard deviation is smaller than a sixth predetermined threshold value; and determining that the flexible display panel is in a non-curved state upon the average value is greater than the seventh predetermined threshold value; or determining that the flexible display panel is in a partially curved state upon the average value is smaller than the seventh predetermined threshold value and greater than the eighth predetermined threshold value; or determining that the flexible display panel is in a completely curved state upon the average value is smaller than the eighth predetermined threshold value, wherein the seventh predetermined threshold value is greater than the eighth predetermined threshold value.

BRIEF DESCRIPTION OF THE DRAWINGS

Hereafter, the embodiments of the present invention will be described in a more detailed way with reference to the accompanying drawings, so as make one person skilled in the art be able to understand the present invention more clearly, wherein.

DETAILED DESCRIPTION

Hereafter, the technical solutions in the embodiments of the present disclosure will be described in a clearly and fully understandable way in connection with the drawings in the embodiments of the present disclosure. It is obvious that the described embodiments are just a part but not all of the embodiments of the disclosure. Based on the described embodiments herein, one person skilled in the art can obtain other embodiment(s), without any inventive work, which should be within the scope of the disclosure.

Unless otherwise defined, the technical terminology or scientific terminology used herein should have the same meaning as commonly understood by one of ordinary skill in the art to which this invention belongs. Likewise, terms like "first," "second," etc., which are used in the description and the claims of the present application for invention, are not intended to indicate any sequence, amount or importance, but distinguish various components. The phrases "connect", "connected", etc., are not intended to define a physical connection or mechanical connection, but may include an electrical connection, directly or indirectly. "On," "under," "left," "right" or the like is only used to describe a relative positional relationship, and when the absolute position of a described object is changed, the relative positional relationship might also be changed accordingly.

Figure 1:
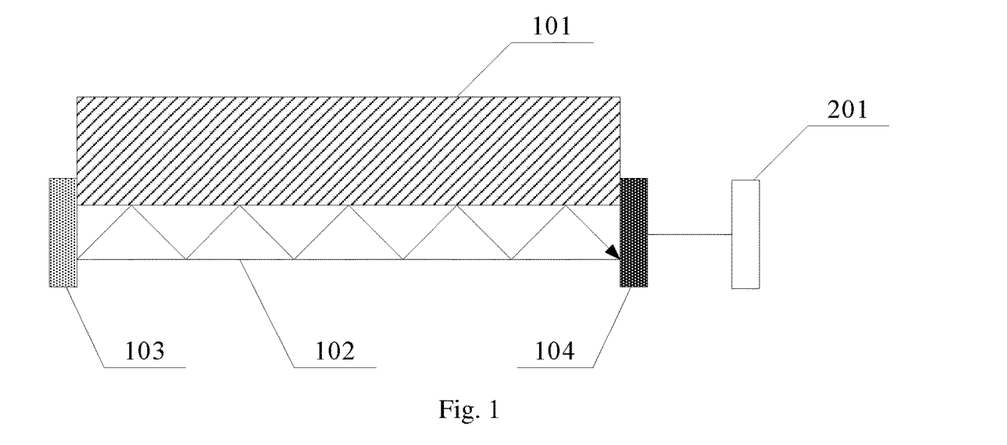
FIGS. 1, 5 and 6 are structural schematic diagrams of a flexible display device provided by the embodiments of the present invention, in which a flexible display panel is in a non-curved state, a partially curved state and a completely curved state, respectively.

Embodiments of the present invention provide a flexible display device, as illustrated by FIG. 1, including a flexible display panel 101 and a controller 201; the flexible display panel 101 includes: N optical fiber 102 which can be curved with the curving of the flexible display panel 101, a laser transmitter 103 disposed at an input terminal of the optical fiber 102, and a light intensity detector 104 disposed at an output terminal of the optical fiber, wherein N is an integer greater than or equal to 1; the controller 201 is configured to acquire a light intensity parameter at the output terminal of the M optical fiber 102 detected by the light intensity detector 104 and to determine the current curved state of the flexible display panel 101 according to the light intensity parameter at the output terminal of the M optical fiber 102, wherein the M is an integer greater than or equal to 1 and smaller than or equal to N.

A location of the optical fiber 102 is not particularly defined in the embodiments of the present invention. For example, the optical fiber 102 may be disposed at a rear surface or side surface of the flexible display panel 101, or may be disposed adjacent to the flexible display panel 101 or not adjacent to the flexible display panel 101; as long as a curved degree of the optical fiber 102 is as same as that of the flexible display panel 101. FIG. 1 only illustrates one of the possible configurations. The number of the optical fiber 102 is not particularly defined in the embodiments of the present invention, either, but can be set by those skilled in the art according to the specific situations; besides, the N optical fibers 102 can be divided into several groups disposed in different directions on the flexible display panel 101, wherein the directions along which the M optical fibers 102 are disposed can be consistent with each other, so as to detect the curved degree of the flexible display panel 101 in that direction.

As illustrated by FIG. 1, the laser transmitter 103 is disposed at an input terminal of the optical fiber 102, and configured to transmit laser into the optical fiber; the light intensity detector 104 is disposed at an output terminal of the optical fiber 102, and configured to detect a light intensity parameter of the laser outputted by the output terminal of the optical fiber 102. The light intensity parameter includes parameters such as light intensity, wavelength and electric current; for example, it generally selects the light intensity of the laser as the light intensity parameter.

The controller 201 may be a control circuit, or may be a CPU chip, and the embodiments of the present invention are not limited thereto. For example, the controller may be a control device which is independently disposed, or may be a control substrate of the flexible display device. Upon the control substrate of the flexible display device is employed as a controller, it is not necessary to dispose an extra control device, so as to reduce the technical costs and save the resources.

Figure 2:
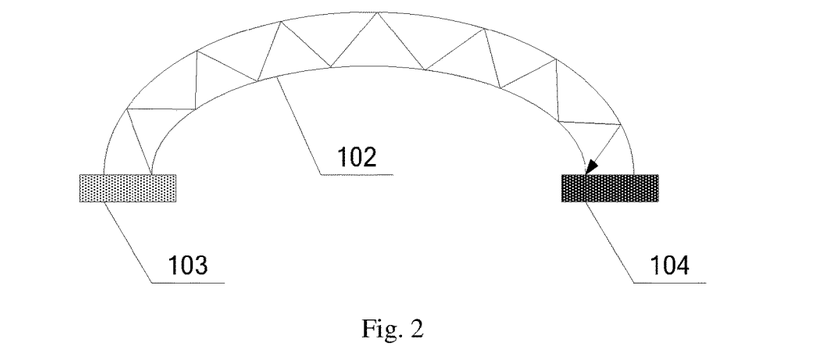
FIG. 2 is a structural schematic diagram of another example of a flexible display device provided by the embodiments of the present invention in which an optical fiber is in a curved state.

FIG. 1 illustrates a flexible display panel 101 in a non-curved state. Considering that the curved degree of the optical fiber 102 is as same as that of the flexible display panel 101, the optical fiber 102 illustrated in FIG. 1 is also in a non-curved state. FIG. 2 illustrates a case where the optical fiber 102 is in a curved state, but not illustrates the flexible display panel. Generally, for optical fibers with the same length, the greater the curved degree of the optical fiber is, the longer the optical path of the laser transmitting in the optical fiber will be; furthermore, the longer the optical path is, the smaller the light intensity parameter of laser at the output terminal of the optical fiber will be; as a result, the curved state of the optical fiber can be determined by detecting a value of the light intensity parameter of laser at the output terminal of the optical fiber, so that the curved state of the flexible display panel can be obtained. For example, assuming that the length of the optical fibers in FIG. 1 and FIG. 2 are the same, the flexible display panel 101 is in a non-curved state and the value of the light intensity detected by the light intensity detector 104 is known in advance, then the curved state of the optical fiber 102 in FIG. 2 can be determined by detecting the value of the light intensity at the output terminal of the optical fiber 102 in FIG. 2 via the light intensity detector 104 and comparing the two values of light intensity so as to obtain the curved state of the flexible display panel which is as same as that of the optical fiber 102.

As stated above, compared with the known technology, the flexible display device provided by the embodiments of the present invention is provided with N optical fiber which can be curved with the curving of the flexible display panel on the flexible display panel so as to determine the current curved state of the flexible display panel according to the light intensity parameter at the output terminal of the optical fiber in view of the fact that the greater the curved degree of the optical fiber is, the longer the optical path of the laser transmitting in the optical fiber will be and the fact that the longer the optical path is, the smaller the light intensity parameter of the laser will be, so that different display modes can be selected according to different curved states; in this way, the situation where the user cannot see a part of the image displayed on a flexible display panel in a curved state is avoided, and the overall application effect of the display is improved.

It is noted that, due to the curved structure of the human body, some wearable devices are generally not planar, and it's also more and more popular to dispose a flexible OLED display panel on the wearable device. Generally, a human-computer interaction between the wearable device and a user wearing the wearable device is relatively frequent, and the wearable device cannot predict the current state of the flexible OLED display panel; as a result, if the curved degree of the flexible OLED display is relatively large, some buttons used for human-computer interactions may not be touched by the user such that the user cannot input required operations, thereby affecting a operability of the human-computer interaction. By disposing an optical fiber curved with the curving of the flexible display panel on the flexible display panel, the current curved state of the flexible display panel can be determined according to the light intensity parameter at the output terminal of the optical fiber, and different operation modes can be selected according to different curved states; in this way, the situation where the user cannot input the required operation can be avoided, so as to improve the operability of the human-computer interaction.

Figure 3:
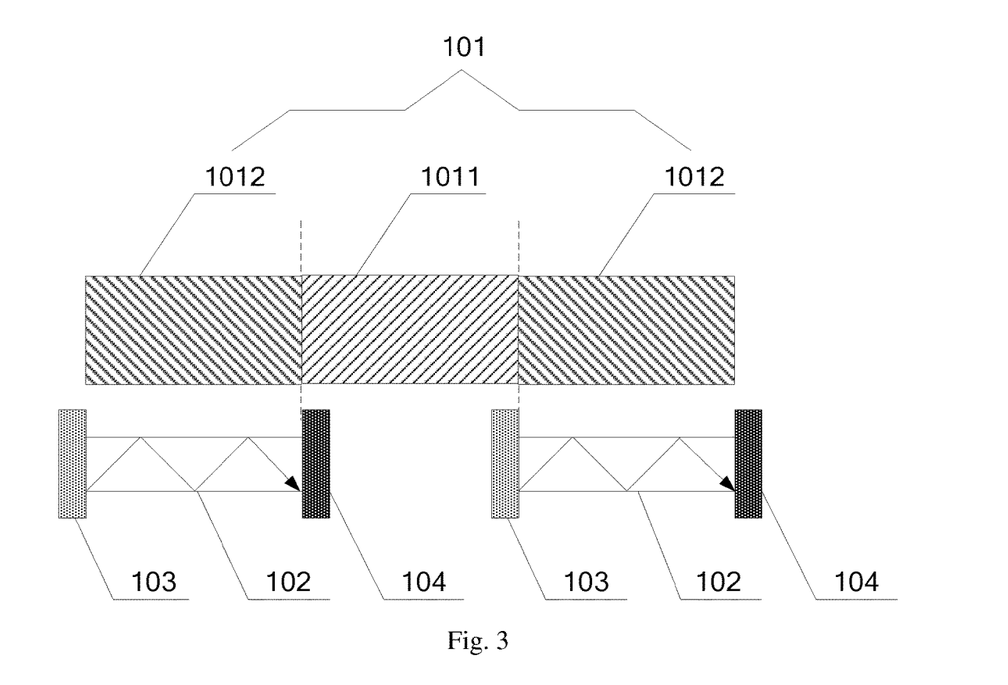
FIG. 3 is a structural schematic diagram of still another example of a flexible display device provided by the embodiments of the present invention.

In an exemplary example, as illustrated by FIG. 3, the flexible display panel 101 includes an inflexible region 1011 and a flexible region 1012, and N optical fibers 102 are disposed in the flexible region 1012. As illustrated by FIG. 3, only the location on the flexible display panel 101 corresponding to the flexible region 1012 is provided with an optical fiber 102, through which the curved degree of the flexible display panel 101 still can be determined based on the abovementioned principle because the curved state of the optical fiber 102 always corresponds to the curved state of the flexible display panel, thereby saving the costs; redundant description will be omitted herein.

Figure 4:
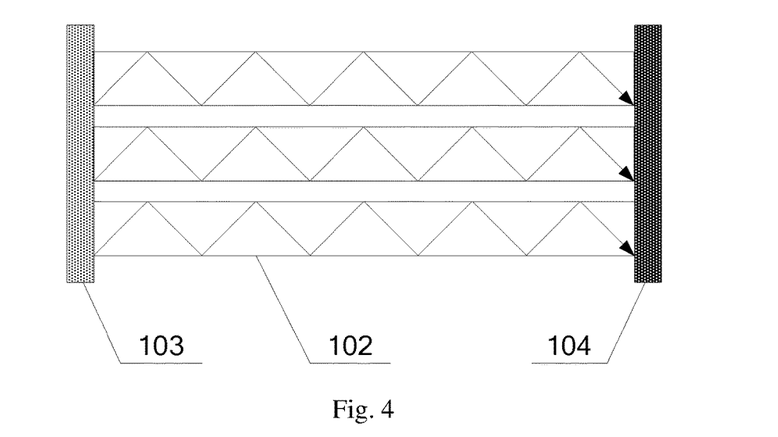
FIG. 4 is a structural schematic diagram of yet another example of a flexible display device provided by the embodiments of the present invention.

As illustrated by FIG. 4, in an example, the laser transmitter transmits laser with the same light intensity into the M optical fibers. As illustrated by FIG. 4, plural optical fibers 102 are disposed in the same direction, and have little difference in the light intensity parameters at the output terminals of the optical fibers given the same light intensity of the laser emitted by the laser transmitter, so that it is easier to determine the curved degree of the display panel. For example, a laser transmitter 103 can be provided with a plurality of transmitting heads, so as to transmit laser into a plurality of optical fibers 102; or a plurality of laser transmitters 103 may be disposed, and each of the laser transmitters 103 transmits laser to one corresponding optical fiber 102; the embodiments of the present invention are not limited thereto. Likewise, a light intensity detector 104 may be provided with a plurality of receiving probes, so as to receive the light intensity parameters of the laser at the output terminals of the optical fibers 102; or a plurality of light intensity detectors 104 may be disposed, and each of the light intensity detectors 104 receives a light intensity parameter of the laser at the output terminal of the corresponding optical fiber 102; the embodiments of the present invention are not limited thereto.

In an exemplary example, upon M is equal to 1, the controller is configured to determine that the flexible display panel is in a non-curved state upon the light intensity parameter is greater than a first predetermined threshold value, or determine that the flexible display panel is in a curved state upon the light intensity parameter is smaller than the first predetermined threshold value. The first predetermined threshold value is a value preset by one person skilled in the art according to the practical situation, without limited in the embodiments of the present invention.

For example, assuming that the first predetermined threshold value is L1, upon the light intensity parameter L detected by the light intensity detector is greater than the first predetermined threshold value L1, it can be determined that the flexible display panel is in a non-curved state, then the flexible display panel can display with full screen; upon the light intensity parameter L detected by the light intensity detector is smaller than the first predetermined threshold value L1, it can be determined that the flexible display panel is in a curved state, then the flexible display panel can display with partial screen or does not display. Especially, upon the light intensity parameter L detected by the light intensity detector is equal to the first predetermined threshold value L1, it means that the flexible display panel is in a critical state between the non-curved state and the curved state, then the display panel can be regarded as in either curved state or non-curved state, which can be configured by one person skilled in the art in his own consideration.

In an exemplary example, upon M is equal to 1, the controller is further configured to determine that the flexible display panel is a non-curved state upon the light intensity parameter is greater than a second predetermined threshold value; determine that the flexible display panel is in a partially curved state upon the light intensity parameter is smaller than the second predetermined threshold value and greater than a third predetermined threshold value; or determine that the flexible display panel is in a completely curved state upon the light intensity parameter is smaller than the third predetermined threshold value; wherein the second predetermined threshold value is greater than the third predetermined threshold value. Both the second predetermined threshold value and the third predetermined threshold value are values preset by one person skilled in the art according to the actual situation, without limited in the embodiments of the present invention, as long as the second predetermined threshold value is greater than the third predetermined threshold value.

Figure 5:
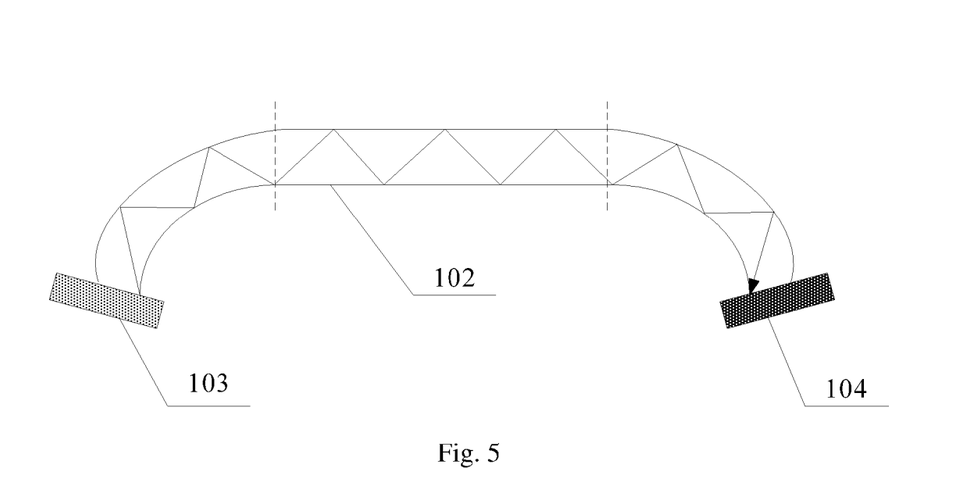
Figure 6:
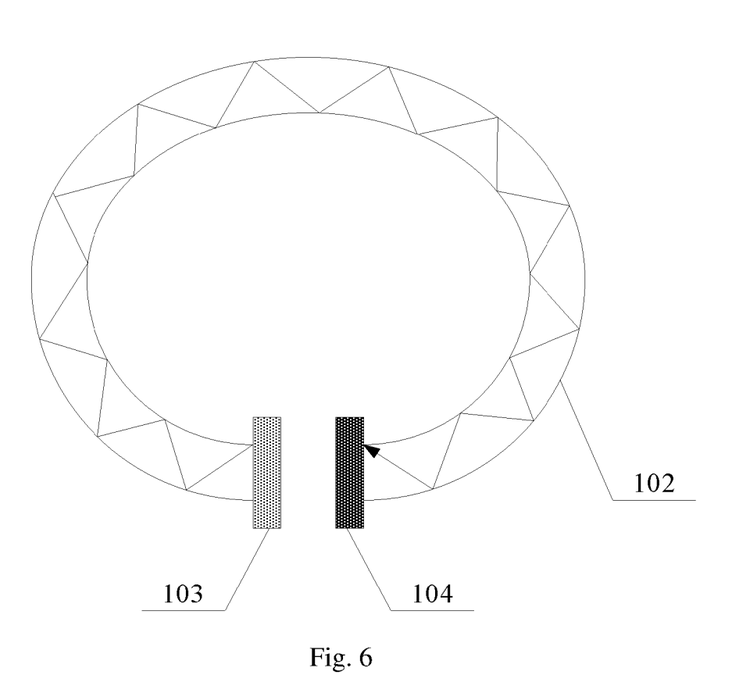

For example, as illustrated by FIG. 1, FIG. 5 and FIG. 6, assuming that the second predetermined threshold value is L2, the third predetermined threshold value is L3, and L2 is greater than L3, upon the light intensity parameter L detected by the light intensity detector is greater than the second predetermined threshold value L2, it can be determined that the flexible display panel is in a non-curved state, as illustrated by FIG. 1, then the flexible display panel can display with full screen; upon the light intensity parameter L detected by the light intensity detector is smaller than the second predetermined threshold value L2 and greater than the third predetermined threshold value L3, it can be determined that the flexible display panel is in a partially curved state, as illustrated by FIG. 5, then the flexible display panel can display with partial screen or does not display; upon the light intensity parameter L detected by the light intensity detector is smaller than the third predetermined threshold value L3, it can be determined that the flexible display panel is in a completely curved state, as illustrated by FIG. 6, then the flexible display panel does not display. Especially, upon the light intensity parameter L detected by the light intensity detector is equal to the second predetermined threshold value L2, it means that the flexible display panel is in a critical state between the non-curved state and the partially curved state; upon the light intensity parameter L detected by the light intensity detector is equal to the third predetermined threshold value L3, it means that the flexible display panel is in a critical state between the partially curved state and the completely curved state; in such case, the curved state of the flexible display panel can be determined by those skilled in the art in his own consideration.

In an exemplary example, as illustrated by FIG. 4, in a case where M is greater than or equal to 2, the M optical fibers are disposed in parallel; and the controller can be configured to acquire a standard deviation of the light intensity parameters at the output terminals of the M optical fibers; upon the standard deviation is smaller than a fourth predetermined threshold value, further determining whether an average value of the light intensity parameters at the output terminals of the M optical fibers is greater than a fifth predetermined threshold value or not, if so, it can be determined that the flexible display panel is in a non-curved state; and if not, it can be determined that the flexible display panel is in a curved state.

In this example, the fourth predetermined threshold value and the fifth predetermined threshold value are values preset by one person skilled in the art according to the practical situation, without limited in the embodiments of the present invention.

In this example, after acquiring the light intensity parameters at the output terminals of the M optical fibers, the standard deviation of the M light intensity parameters can be firstly calculated, so as to evaluate a fluctuation degree of the M light intensity parameters; the smaller the standard deviation of the M light intensity parameters is, the smaller the fluctuation degree of the M light intensity parameters will be which further means that the M light intensity parameters can more accurately measure the curved state of the flexible display panel.

For example, assuming that the fourth predetermined threshold value is L4 and the fifth predetermined threshold value is L5, then the standard deviation LS of the light intensity parameters at the output terminals of the M optical fibers can be calculated firstly; upon the standard deviation LS of the light intensity parameters is greater than the fourth predetermined threshold value L4, it means that the fluctuation degree of the light intensity parameters at the output terminals of the M optical fibers is relatively large and relatively inaccurate, then it's to re-obtain the standard deviation; upon the standard deviation LS of the light intensity parameters is smaller than the fourth predetermined threshold value L4, an average value LP of the light intensity parameters at the output terminals of the M optical fibers can be calculated, and upon the average value LP is greater than a fifth predetermine threshold value L5, it can be determined that the flexible display panel is in a non-curved state, then the flexible display panel can display with full screen; upon the average value LP is smaller than the fifth predetermined threshold value L5, it can be determined that the flexible display panel is in a curved state, then the flexible display panel can display with partial screen or does not display.

It is to be noted that, upon the critical situation where the standard deviation LS is equal to the fourth predetermined threshold value L4, or the average value LP is equal to the fifth predetermined threshold value L5 appears, the flexible display panel can be regarded as in either non-curved state or curved state which can be determined by those skilled in the art in his own consideration, without limited in the embodiments of the present invention.

As stated above, by disposing the M optical fibers in parallel in one direction, the curved state of the flexible display panel in this direction can be measured more accurately.

In an exemplary example, as illustrated by FIG. 4, upon M is greater than or equal to 2, the M optical fibers are disposed in parallel; then the controller is further configured to acquire a standard deviation of the light intensity parameters at the output terminals of the M optical fibers; upon the standard deviation is smaller than a sixth predetermined threshold value, further determining whether an average value of the light intensity parameters at the output terminals of the M optical fibers is greater than a seventh predetermined threshold value; upon the average value is greater than the seventh predetermined threshold value, it can be determined that the flexible display panel is in a non-curved state; if the average value is smaller than the seventh predetermined threshold value and greater than an eighth predetermined threshold value, it can be determined that the flexible display panel is in a partially curved state; upon the average value is smaller than the eighth predetermined threshold value, it can be determined that the display panel is in a completely curved state, wherein the seventh predetermined threshold value is greater than the eighth predetermined threshold value.

In this example, the sixth predetermined threshold value, the seventh predetermined threshold value and the eighth predetermined threshold value are all values preset by one person skilled in the art according to the practical situation without limited in the embodiments of the present invention as long as the seventh predetermined threshold value is greater than the eighth predetermined threshold value.

For example, assuming that the sixth predetermined threshold value is L6, the seventh predetermined threshold value is L7, the eighth predetermined threshold value is L8, and L7 is greater than L8, upon the acquired standard deviation LS of the light intensity parameters at the output terminals of the M optical fibers is smaller than the sixth predetermined threshold value L6, calculating the average value LP of the light intensity parameters at the output terminals of the M optical fibers; further, upon the average value LP is greater than the seventh predetermined threshold value L7, it can be determined that the flexible display panel is in a non-curved state, then the flexible display panel can display and operate with full screen; upon the average value LP is smaller than the seventh predetermined threshold value L7 and greater than the eighth predetermined threshold value L8, it can be determined that the flexible display panel is in a partially curved state, then the flexible display panel can display and operate with partial screen; upon the average value LP is smaller than the eighth predetermined threshold value L8, it can be determined that the flexible display panel is in a completely curved state, then the flexible display panel does not display or operate.

It is to be noted that, upon the critical situation where the average value LP is equal to the seventh predetermined threshold value L7 or the average value LP is equal to the eighth predetermined threshold value L8 appears, the flexible display panel can be regarded as in any of non-curved state, partially curved state and curved state, which can be determined by those skilled in the art in his own consideration without limited in the embodiments of the present invention.

As stated above, the flexible display device provided by the embodiments of the present invention includes a flexible display panel and a controller. The flexible display panel includes N optical fiber which can be curved with the curving of the flexible display panel, a laser transmitter disposed at an input terminal of the optical fiber and a light intensity detector disposed at an output terminal of the optical fiber, wherein N is an integer greater than or equal to 1. The controller is configured to acquire the light intensity parameter at the output terminal of the M optical fiber detected by the light intensity detector, and determine the current curved state of the flexible display panel according to the light intensity parameter at the output terminal of the M optical fiber, wherein M is an integer greater than or equal to 1 and smaller than or equal to N. Compared with the known technology, the flexible display device provided by the embodiments of the present invention is provided with N optical fiber which can be curved with the curving of the flexible display panel, so as to determine the current curved state of the flexible display panel according to the light intensity parameter at the output terminal of the optical fiber in view of the fact that the greater the curved degree of the optical fiber is, the longer the optical path of laser transmitting in the optical fiber will be, and that the longer the optical path is, the smaller the light intensity parameter of laser will be, so that different display modes can be selected according to different curved states; in this way, the situation where the user cannot see a part of a larger image displayed on a flexible display panel in a curved state is avoided, and the overall application effect of the display device is improved.

Embodiments of the present invention further provide a method of detecting a curved state of a flexible display panel applied for a flexible display device, the flexible display panel includes N optical fiber which can be curved with the curving of the flexible display panel, a light transmitter disposed at an input terminal of the optical fiber and a light intensity detector disposed at an output terminal of the optical fiber, wherein N is an integer greater than or equal to 1.

Figure 7:
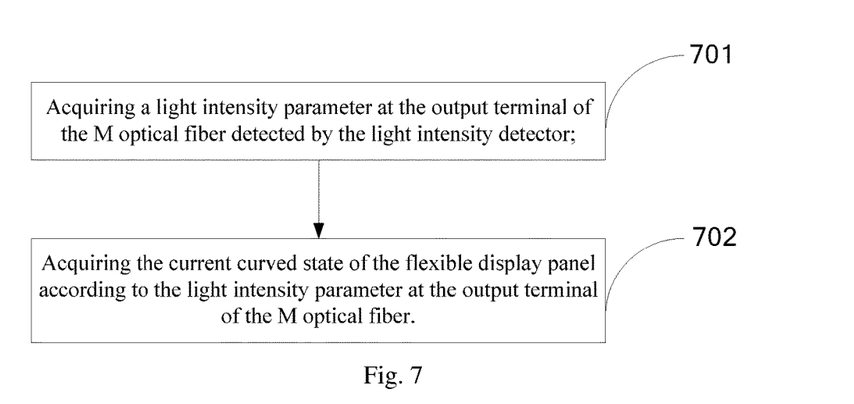
FIG. 7 is a flow diagram of a method of detecting a curved state of a flexible display panel provided by the embodiments of the present invention.

As illustrated by FIG. 7, the method includes:

Step 701: acquiring a light intensity parameter at the output terminal of the M optical fiber detected by the light intensity detector, wherein M is an integer greater than or equal to 1 and smaller than or equal to N.

Step 702: acquiring the current curved state of the flexible display panel according to the light intensity parameter at the output terminal of the M optical fiber.

In this way, compared with the known technology, the method of detecting a curved state of a flexible display panel provided by the embodiments of the present invention disposes N optical fiber which can be curved with the curving of the flexible display panel on the flexible display panel, and determines the current curved state of the flexible display panel according to the light intensity parameter at the output terminal of the optical fiber in view of the fact that the greater the curved degree of the optical fiber is, the longer the optical path of laser transmitting in the optical fiber will be, and that the longer the optical path is, the smaller of the light intensity parameter of the laser will be, so that different display modes can be selected according to the different curved states; in this way, the situation where the user cannot see a part of a larger image displayed on a flexible display panel in a curved state can be avoided, and the overall usage effect of the display can be improved.

Figure 8:
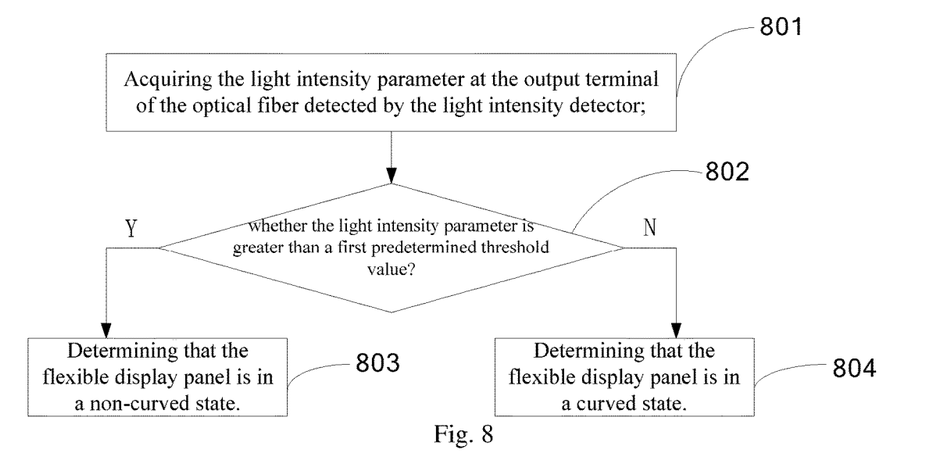
FIG. 8 is a flow diagram of another example of a method of detecting a curved state of a flexible display panel provided by the embodiments of the present invention.

In an exemplary example, as illustrated by FIG. 8, in a case where M is equal to 1, the method may include:

Step 801: acquiring the light intensity parameter at the output terminal of the optical fiber detected by the light intensity detector.

Step 802: determining whether the light intensity parameter is greater than a first predetermined threshold value or not, if so, executing the step 803; if not, executing step 804.

Step 803: determining that the flexible display panel is in a non-curved state.

Step 804: determining that the flexible display panel is in a curved state.

In the present example, the first predetermined threshold value is a value preset by one person skilled in the art according to the practical situation, without limited in the embodiments of the present invention.

Figure 9:
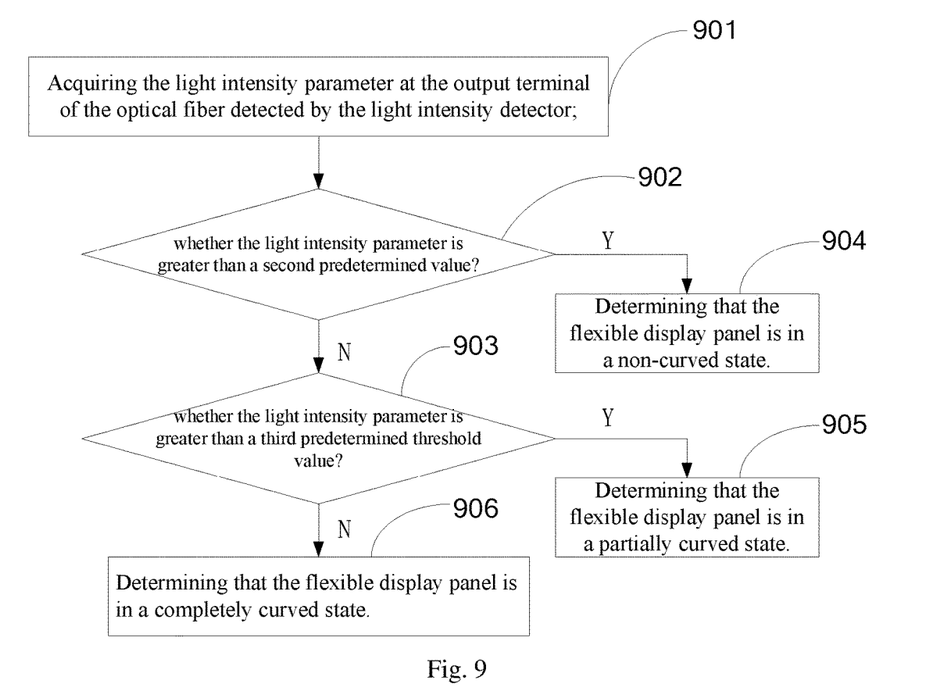
FIG. 9 is a flow diagram of still another example of a method of detecting a curved state of a flexible display panel provided by the embodiments of the present invention.

In another exemplary example, as illustrated by FIG. 9, in a case where M is equal to 1, the method may include:

Step 901: acquiring the light intensity parameter at the output terminal of the optical fiber detected by the light intensity detector.

Step 902: determining whether the light intensity parameter is greater than a second predetermined value, if so, executing step 904; if no, executing step 903.

Step 903: determining whether the light intensity parameter is greater than a third predetermined threshold value, if so, executing step 905; if no, executing step 906.

Step 904: determining that the flexible display panel is in a non-curved state.

Step 905: determining that the flexible display panel is in a partially curved state.

Step 906: determining that the flexible display panel is in a completely curved state.

In the present example, the second predetermined threshold value and the third predetermined threshold value are values preset by one person skilled in the art according to the practical situation, without limited in the embodiments of the present invention as long as the second predetermined threshold value is greater than the third predetermined threshold value.

Figure 10:
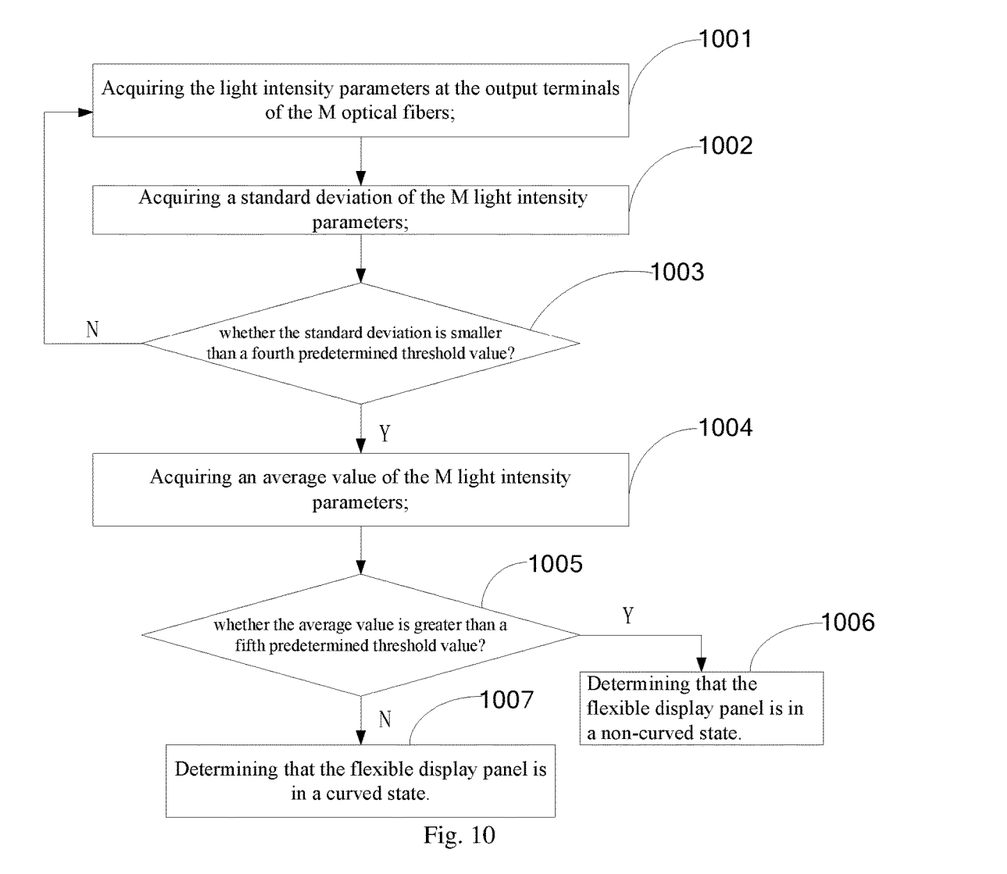
FIG. 10 is a flow diagram of yet another example of a method of detecting a curved state of a flexible display panel provided by the embodiments of the present invention.

In another exemplary example, as illustrated by FIG. 10, in a case where M is greater than or equal to 2, the M optical fibers are disposed in parallel, and the method may include:

Step 1001: acquiring the light intensity parameters at the output terminals of the M optical fibers.

Step 1002: acquiring a standard deviation of the M light intensity parameters.

Step 1003: determining whether the standard deviation is smaller than a fourth predetermined threshold value, if so, executing step 1004; if no, executing step 1001.

Step 1004: acquiring an average value of the M light intensity parameters.

Step 1005: determining whether the average value is greater than a fifth predetermined threshold value, if so, executing step 1006; if no, executing step 1007.

Step 1006: determining that the flexible display panel is in a non-curved state.

Step 1007: determining that the flexible display panel is in a curved state.

In the present example, the fourth predetermined threshold value and the fifth predetermined threshold value are values preset by one person skilled in the art according to the practical situation, without limited in the embodiments of the present invention.

Figure 11:
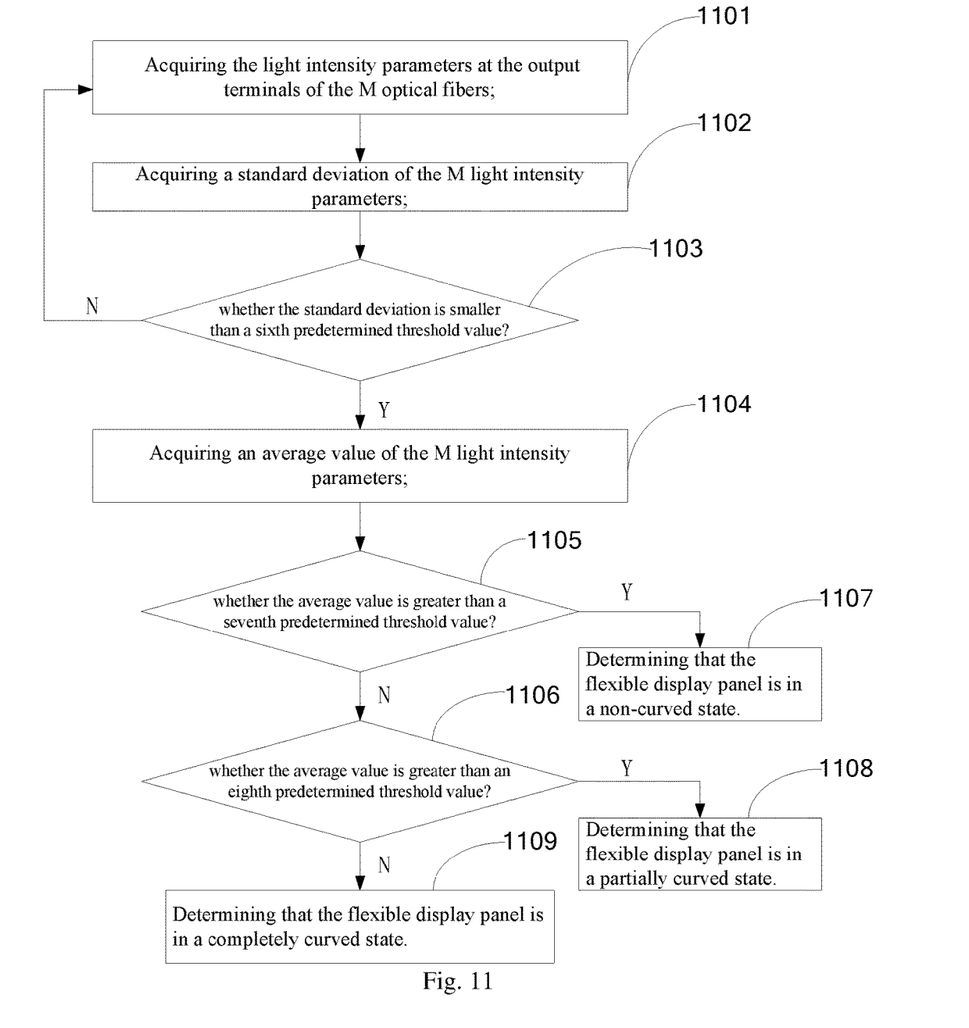
FIG. 11 is a flow diagram of further another example of a method of detecting a curved state of a flexible display panel provided by the embodiments of the present invention.

In another exemplary example, as illustrated by FIG. 11, in a case where M is greater than or equal to 2, the M optical fibers are disposed in parallel; and the method may include:

Step 1101: acquiring the light intensity parameters at the output terminals of the M optical fibers.

Step 1102: acquiring a standard deviation of the M light intensity parameters.

Step 1103: determining whether the standard deviation is smaller than a sixth predetermined threshold value, if so, executing step 1104; if not, executing step 1101.

Step 1104: acquiring an average value of the M light intensity parameters.

Step 1105: determining whether the average value is greater than a seventh predetermined threshold value, if so, executing step 1107; if not, executing step 1106.

Step 1106: determining whether the average value is greater than an eighth predetermined threshold value, if so, executing step 1108; if not, executing step 1109.

Step 1107: determining that the flexible display panel is in a non-curved state.

Step 1108: determining that the flexible display panel is in a partially curved state.

Step 1109: determining that the flexible display panel is in a completely curved state.

In the present example, the sixth predetermined threshold value, the seventh predetermined threshold value and the eighth predetermined threshold value are values preset by one person skilled in the art according to the practical situation, without limited in the embodiments of the present invention, as long as the seventh predetermined threshold value is greater than the eighth predetermined threshold value.

In the method of detecting a curved state of a flexible display panel provided by the embodiments of the present invention, acquiring the light intensity parameter at the output terminal of the M optical fiber detected by the light intensity detector, and determining the current curved state of the flexible display panel according to the light intensity parameters at the output terminal of the M optical fiber, wherein M is an integer greater than or equal to 1 and smaller than or equal to N. Compared with the known technology, the method of detecting a curved state of a flexible display panel provided by the embodiments of the present invention disposes N optical fibers which can be curve with the curving of the flexible display panel on the flexible display panel, so as to determine the current curved state of the flexible display panel according to the light intensity parameter at the output terminal of the optical fiber in view of the fact that the greater the curved degree of the optical fiber is, the longer the optical path of laser transmitting in the optical fiber will be, and that the longer the optical path is, the smaller the light intensity parameter of laser will be, so that different display modes can be selected according to different curved states; in this way, the situation where the user cannot see a part of a larger image displayed on a flexible display panel in a curved state is avoided, and the overall application effect of the display device is improved.

The foregoing are merely specific embodiments of the invention, but not limitative to the protection scope of the present disclosure. Therefore, the protection scope of the invention should be defined by the accompanying claims.

The present disclosure claims the benefits of Chinese patent application No. 201510312051.2, which was filed with the SIPO on Jun. 8, 2015 under the title of "FLEXIBLE DISPLAY DEVICE AND METHOD OF DETECTING CURVED STATE OF DISPLAY PANEL" and is fully incorporated herein by reference as part of this application.

What is claimed is:

1. A flexible display device, comprising:
a flexible display panel; and
a controller, wherein
the flexible display panel comprises:
   N optical fiber that can be curved with curving of the flexible display panel, wherein the N is an integer greater than or equal to 1;
   a laser transmitter that is disposed at an input terminal of the optical fiber and configured to transmit laser into the optical fiber; and
   a light intensity detector that is disposed at an output terminal of the optical fiber and configured to detect a light intensity parameter at the output terminal; and
the controller is configured to acquire the light intensity parameter at the output terminal of the M optical fiber detected by the light intensity detector and to determine a current curved state of the flexible display panel according to the light intensity parameter at the output terminal of the M optical fiber, wherein the M is an integer greater than or equal to 1 and smaller than or equal to N.

2. The flexible display device according to claim 1, wherein the flexible display panel comprises an inflexible region and a flexible region, and the N optical fiber is disposed in the flexible region.

3. The flexible display device according to claim 2, wherein the laser transmitter is configured to transmit laser with a same light intensity into the M optical fiber.

4. The flexible display device according to claim 3, wherein the M is equal to 1, and the controller is configured to:
   determine that the flexible display panel is in a non-curved state upon the light intensity parameter is greater than a first predetermined threshold value; or
   determine that the flexible display panel is in a curved state upon the light intensity parameter is smaller than the first predetermined threshold value.

5. The flexible display device according to claim 3, wherein the M is equal to 1, and
the controller is configured to:
   determine that the flexible display panel is in a non-curved state upon the light intensity parameter is greater than a second predetermined threshold value; or,
   determine that the flexible display is in a partially curved state upon the light intensity parameter is smaller than the second predetermined threshold value and greater than a third predetermined threshold value; or,
   determine that the flexible display is in a completely curved state upon the light intensity parameter is smaller than the third predetermined threshold value,
   wherein the second predetermined threshold value is greater than the third predetermined threshold value.

6. The flexible display device according to claim 3, wherein the M is greater than or equal to 2, the M optical fibers are disposed in parallel; and
the controller is configured to:
   acquire a standard deviation of the light intensity parameters at the output terminals of the M optical fibers;
   upon the standard deviation is smaller than a fourth predetermined threshold value, determine whether an average value of the light intensity parameters at the output terminals of the M optical fibers is greater than a fifth predetermined threshold value; and
   determine that the flexible display panel is in a non-curved state upon the average value is greater than the fifth predetermined threshold value; or
   determine that the flexible display panel is in a curved state upon the average value is smaller than the fifth predetermined threshold value.

7. The flexible display device according to claim 3, wherein the M is greater than or equal to 2, the M optical fibers are disposed in parallel; and
the controller is configured to:
   acquire a standard deviation of the light intensity parameters at the output terminals of the M optical fibers;
   upon the standard deviation is smaller than a sixth predetermined threshold value, determine whether an average value of the light intensity parameters at the output terminals of the M optical fibers is greater than a seventh predetermined threshold value; and
   determine that the flexible display panel is in a non-curved state upon the average value is greater than the seventh predetermined threshold value; or,
   determine that the flexible display panel is in a partially curved state upon the average value is smaller than the seventh predetermined threshold value and greater than an eighth predetermined threshold value; or
   determine that the flexible display panel is in a completely curved state upon the average value is smaller than the eighth predetermined threshold value,
wherein the seventh predetermined threshold value is greater than the eighth predetermined threshold value.

8. The flexible display device according to claim 1, wherein the laser transmitter is configured to transmit laser with a same light intensity into the M optical fiber.

9. The flexible display device according to claim 8, wherein the M is equal to 1, and the controller is configured to:
   determine that the flexible display panel is in a non-curved state upon the light intensity parameter is greater than a first predetermined threshold value; or
   determine that the flexible display panel is in a curved state upon the light intensity parameter is smaller than the first predetermined threshold value.

10. The flexible display device according to claim 8, wherein the M is equal to 1, and
the controller is configured to:
   determine that the flexible display panel is in a non-curved state upon the light intensity parameter is greater than a second predetermined threshold value; or,
   determine that the flexible display panel is in a partially curved state upon the light intensity parameter is smaller than the second predetermined threshold value and greater than a third predetermined threshold value; or,
   determine that the flexible display panel is in a completely curved state upon the light intensity parameter is smaller than the third predetermined threshold value,
   wherein the second predetermined threshold value is greater than the third predetermined threshold value.

11. The flexible display device according to claim 8, wherein the M is greater than or equal to 2, the M optical fibers are disposed in parallel; and
the controller is configured to:
   acquire a standard deviation of the light intensity parameters at the output terminals of the M optical fibers;

upon the standard deviation is smaller than a fourth predetermined threshold value, determine whether an average value of the light intensity parameters at the output terminals of the M optical fibers is greater than a fifth predetermined threshold value; and determine that the flexible display panel is in a non-curved state upon the average value is greater than the fifth predetermined threshold value; or determine that the flexible display panel is in a curved state upon the average value is smaller than the fifth predetermined threshold value.

12. The flexible display device according to claim 8, wherein the M is greater than or equal to 2, the M optical fibers are disposed in parallel; and the controller is configured to:

acquire a standard deviation of the light intensity parameters at the output terminals of the M optical fibers;

upon the standard deviation is smaller than a sixth predetermined threshold value, determine whether an average value of the light intensity parameters at the output terminals of the M optical fibers is greater than a seventh predetermined threshold value; and determine that the flexible display panel is in a non-curved state upon the average value is greater than the seventh predetermined threshold value; or, determine that the flexible display panel is in a partially curved state upon the average value is smaller than the seventh predetermined threshold value and greater than an eighth predetermined threshold value; or determine that the flexible display panel is in a completely curved state upon the average value is smaller than the eighth predetermined threshold value, wherein the seventh predetermined threshold value is greater than the eighth predetermined threshold value.

13. A method of detecting a curved state of a flexible display panel in a flexible display device, wherein the flexible display panel comprises N optical fibers which can be curved with curving of the flexible display panel, a laser transmitter disposed at an input terminal of the optical fiber so as to transmit laser into the optical fiber, and a light intensity detector disposed at an output terminal of the optical fiber so as to detect a light intensity parameter at the output terminal, wherein the N is an integer greater than or equal to 1;

the method comprises:

acquiring the light intensity parameter at the output terminal of the M optical fiber detected by the light intensity detector, wherein the M is an integer greater than or equal to 1 and smaller than or equal to N; and determining a current curved state of the flexible display panel according to the light intensity parameter at the output terminal of the M optical fiber.

14. The method according to claim 13, wherein the M is equal to 1, determining the current curved state of the flexible display panel according to the light intensity parameter at the output terminal of the M optical fiber comprises:

determining that the flexible display panel is in a non-curved state upon the light intensity parameter is greater than a first predetermined threshold value; or determining that the flexible display panel is a curved state upon the light intensity parameter is smaller than the first predetermined threshold value.

15. The method according to claim 13, wherein the M is equal to 1, determining the current curved state of the flexible display panel according to the light intensity parameter at the output terminal of the M optical fiber comprises:

determining that the flexible display panel is in a non-curved state upon the light intensity parameter is greater than a second predetermined threshold value; or, determining that the flexible display panel is in a partially curved state upon the light intensity parameter is smaller than the second predetermined threshold value and greater than a third predetermined threshold value; or, determining that the flexible display panel is in a completely curved state upon the light intensity parameter is smaller than the third predetermined threshold value, wherein the second predetermined threshold value is greater than the third predetermined threshold value.

16. The method according to claim 13, wherein the M is greater than or equal to 2, the M optical fibers are disposed in parallel;

determining the current curved state of the flexible display panel according to the light intensity parameter at the output terminal of the M optical fiber comprises:

acquiring a standard deviation of the light intensity parameters at the output terminals of the M optical fibers;

upon the standard deviation is smaller than a fourth predetermined threshold value, determining whether an average value of the light intensity parameters at the output terminals of the M optical fibers is greater than a fifth predetermined threshold value; and determining that the flexible display panel is in a non-curved state upon the average value is greater than the fifth predetermined threshold value; or, determining that the flexible display panel is in a curved state upon the average value is smaller than the fifth predetermined threshold value.

17. The method according to claim 13, wherein the M is greater than or equal to 2, the M optical fibers are disposed in parallel;

determining the current curved state of the flexible display panel according to the light intensity parameter at the output terminal of the M optical fiber comprises:

acquiring a standard deviation of the light intensity parameters at the output terminals of the M optical fibers;

upon the standard deviation is smaller than a sixth predetermined threshold value, determining whether an average value of the light intensity parameters at the output terminals of the M optical fibers is greater than a seventh predetermined threshold value; and determining that the flexible display panel is in a non-curved state upon the average value is greater than the seventh predetermined threshold value; or, determining that the flexible display panel is in a partially curved state upon the average value is smaller than the seventh predetermined threshold value and greater than an eighth predetermined threshold value; or, determining that the flexible display panel is in a completely curved state upon the average value is smaller than the eighth predetermined threshold value, wherein the seventh predetermined threshold value is greater than the eighth predetermined threshold value.

* * * * *